Nov. 9, 1971  R. B. CRONHEIM  3,618,208
FRUIT KNIFE
Filed June 24, 1969
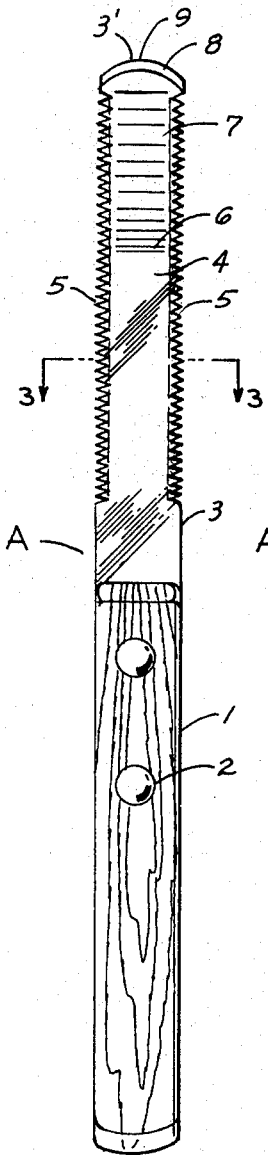
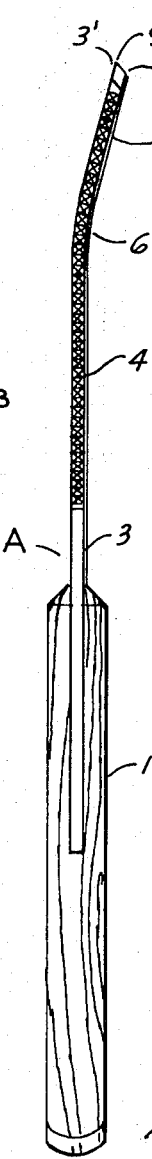
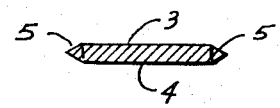
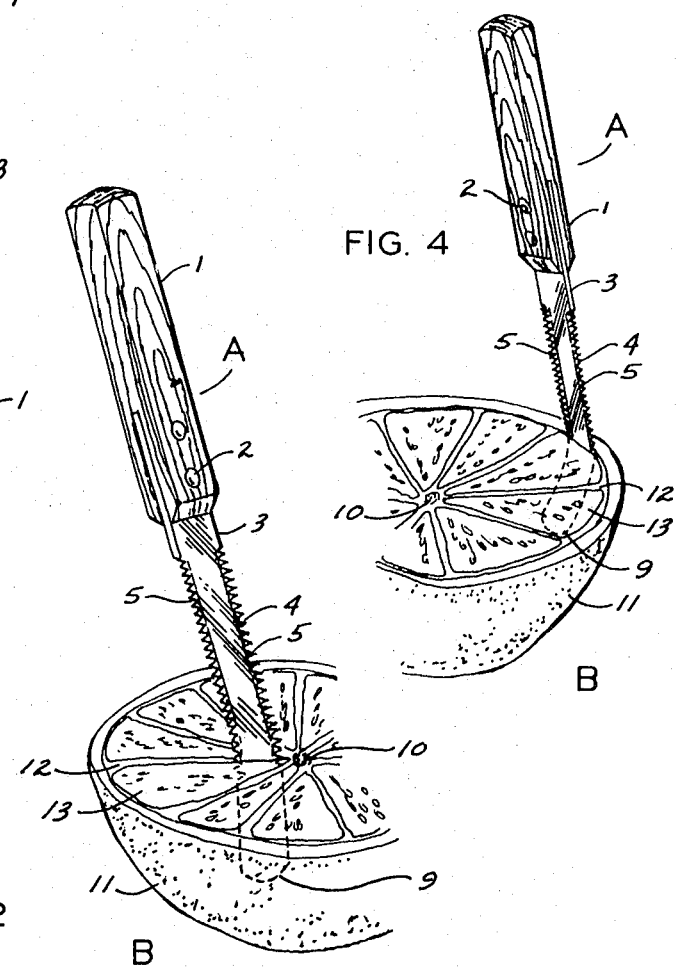
FIG. 1  FIG. 2  FIG. 3  FIG. 4  FIG. 5
INVENTOR
RICHARD B. CRONHEIM
BY Ralph W. Kalish
ATTORNEY United States Patent Office 3,618,208
Patented Nov. 9, 1971

3,618,208
FRUIT KNIFE
Richard B. Cronheim, 7 Upper Barnes,
St. Louis County, Mo. 63124
Filed June 24, 1969, Ser. No. 836,076
Int. Cl. A47j 17/04
U.S. Cl. 30—24                                      1 Claim

ABSTRACT OF THE DISCLOSURE

A fruit knife adapted especially for preparation of citrus fruits having a handle, a blade projecting coaxially from said handle and with each of its side edges being serrated throughout substantially the extent thereof; said blade being angulated at its end remote from the handle, at an angle within the range of 16 to 24 degrees to the plane of the major portion of the blade. The free end edge of said blade is arcuated, being endwise convex, and sharpened to define a cutting portion of greater extent than the width of said blade.

BACKGROUND AND SUMMARY OF THE INVENTION

This invention relates in general to utensils, and, more particularly, to a fruit knife especially adapted in the preparation of citrus fruits for separating the pulp or flesh portions from the rind and webs.

It is an object of the present invention to provide a knife of the character stated which incorporates an arcuated end cutting edge for facilitating introduction of the knife blade between the pulp of citrus fruits and the rind and web portions; said knife further having serrated lateral edges for effecting a severing action while moving the knife about the pulp section to be freed.

It is another object of the present invention to provide a knife of the character stated which incorporates a blade having a major planar portion and a terminal portion related to said planar portion as to approximate the degree of curvature of the fruit rind adjacent the pulp to be freed.

It is another object of the present invention to provide a knife of the character stated which is adapted for effective and speedy removal of the fruit pulp without undesired forceful emission of juice from the pulp being severed.

It is a still further object of the present invention to provide a knife of the character stated which may be most economically produced; which is reliable and durable in usage; which may be easily utilized by any member of a household; and the use of which will assure of maximum pulp removal thereby avoiding the loss of pulp portions through incomplete removal by implements heretofore known.

BRIEF DESCRIPTION OF THE DRAWINGS

FIG. 1 is a top plan view of a knife constructed in accordance with and embodying the present invention.

FIG. 2 is a side elevational view.

FIG. 3 is a transverse sectional view taken on the line 3—3 of FIG. 1.

FIG. 4 is a perspective view illustrating the knife in the course of cutting the pulp from the rind of a citrus fruit.

FIG. 5 is a perspective view of the knife in the course of cutting the pulp from the web of a citrus fruit.

DESCRIPTION OF THE PREFERRED EMBODIMENT

Referring now by reference characters to the drawings which illustrate the preferred embodiment of the present invention, A generally designates a fruit knife comprising a handle 1, as of wood, plastic or the like, which is secured, as by rivets 2, between end portion of a flat blade 3, fabricated from suitable sheet metal and having a major portion as indicated at 4, which is coaxial with said handle 1. Blade 3, along each of its lateral edges, is serrated to present saw-type teeth as at 5; said serrations commencing at a point proximate handle 1 and terminating immediately adjacent the outer or free end 3'. At a point spaced from its free end said blade 3 is transversely bent as at 6 to present a terminal portion indicated 7, the plane of which forms an acute angle with major portion 4 of blade 3; the angle developed therebetween being within the range of approximately 16 to 24 degrees. The outer end margin of blade 3 is arcuated as at 8, being thus, endwise convex. Said end margin 8 is bevelled to define a cutting edge 9 which, due to the curvature of said margin is of greater extent than the width of blade 3.

Referring now to FIGS. 4 and 5, for the purpose of illustrating the use of knife A, B designates a citrus fruit such as grapefruit, lemon, orange, lime, etc. having a core 10, rind or skin 11 and with web members 12, extending radially between core 10 and rind 11. Between adjacent webs 12 is located the pulp or meat 13 of the fruit B.

In the aforesaid figures fruit B comprises a half section as developed by a previous cutting of the whole fruit along a plane normal to core 10.

In order to release pulp 13 from fruit B, knife A is held so as to present blade 3 downwardly with cutting edge 9 addressing the line of demarcation or joint between the particular pulp section 13 and the adjacent portion of rind 11. Slight pressure is directed downwardly whereby cutting edge 9 easily moves between the pulp section 13 and rind 11 for cutting the connecting tissues, with such downward movement of knife A being continued whereby the underface of blade 3 will tend, through the angulation, to follow the particular curvature of rind 11 as said blade 3 is moved toward core 10. Thus, the inner surface of rind 11 serves as a guide for blade 3, causing it to move conformingly within the zone intermediate pulp 13 and rind 11. Such movement of blade 3 will prevent any cutting into rind 11 with undesired loss of fruit juice therethrough. Because of the greater transverse dimension of each pulp section 13 in its outer portion blade 3 may be concurrently shifted laterally while travelling toward core 10 with the serrated edges 5 effecting severance. After having cut the outer and end portion of the particular pulp section 13, knife A may then be withdrawn and cutting edge 9 presented between such section and one of the adjacent webs 12, preferably proximate core 10. Cutting edge 9 will thus penetrate downwardly while said knife A is being moved outwardly for freeing the related side portion of pulp section being freed, like manipulation will be effected for releasing said pulp section 13 from the opposite web 12.

It is apparent from the foregoing that if desired, knife A need not necessarily be removed but could be manipulated so as to follow a continuous path commencing adjacent core 10 along one web 12 entirely around the pulp section 13 to a corresponding point of proximity to core 10 along the opposite web 12.

Thus, each pulp or meat portion 13 may be sharply and quickly severed from connection with rind 11 adjacent webs 12 and core 10.

It is to be observed that knife A is devoid of sharp points or corners so that any puncturing of the rind 11 or pulp section 13 is avoided. The curvature of cutting edge 9 allows effective and easy introduction of blade 3 into the zones to be cut and its arcuate character provides a relatively enhanced line of cutting which could not be effected through the customary pointed knives heretofore generally utilized. Furthermore the angulation of blade 3 together with the arcuate cutting edge 9 presents a novel means for disconnecting the end portion of the pulp sections 13 from the rind 11. As pointed out above, by such an unusual combination rind 11 is adapted to serve as a guiding surface, thereby assuring of full severance of the pulp section 13. With knives of the type which are in current usage, the user has had to effect a judgment as to how deep to cut when proceeding between the rind and pulp section 13 resulting consistently in either a shallow cut with incomplete severance of the fruit meat or an overly deep cut resulting in a puncturing of the rind. With blade 3 moving along rind 11 the upper surface of said blade acts as a scoop, receiving thereupon the pulp section being cut and separating same during the continuance of the cutting action.

I claim:

1. A fruit knife comprising a handle, an elonagted blade having an inner end and an outer end, means connecting said handle and said blade inner end, said blade being free at its outer end and having parallel side edges, said blade being of flat stock and having a major portion proximate said handle and within the plane of said handle, said blade having a flat terminal portion remote from said handle and which includes the blade outer free end, the plane of said terminal portion being at an acute angle to the plane of said major portion for presentation forwardly of said handle during knife usage, each side edge of said blade being serrated substantially throughout the length of said major and terminal portions, the extremity of said blade outer free end being arcuated to present a convex margin, said outer free end also being bevelled throughout its arcuated extent to define a cutting edge, said convex margin having a linear extent greater than the width of said blade.

References Cited

UNITED STATES PATENTS

| | | | |
|---|---|---|---|
| 2,258,448 | 10/1941 | Gesell | 30—24 |
| 3,086,286 | 4/1963 | Faller | 30—24 |
| 1,379,973 | 5/1921 | Gillespie | 30—355 |
| 2,513,663 | 7/1950 | McDaniel | 30—356 X |
| 2,753,632 | 7/1956 | Varn | 30—356 X |
| D. 136,023 | 7/1943 | Phillips | D95—3 |
| 100,862 | 3/1870 | Cooke | 30—24 |

FOREIGN PATENTS

| | | | |
|---|---|---|---|
| 167,230 | 5/1950 | Austria | 30—357 |

THERON E. CONDON, Primary Examiner

R. C. RIORDON, Assistant Examiner

U.S. Cl. X.R.

30—353